United States Patent [19]
Wallrath

[11] Patent Number: 5,718,076
[45] Date of Patent: Feb. 17, 1998

[54] SCHOOL OF BAIT

[76] Inventor: Ronald Lee Wallrath, Rt. 2, Box 23, Mountain Home, Ark. 72653

[21] Appl. No.: 595,127

[22] Filed: Feb. 1, 1996

[51] Int. Cl.$^6$ .................................................. A01K 85/00
[52] U.S. Cl. ........................................ 43/42.13; 43/42.11
[58] Field of Search ............................. 43/42.13, 44.82, 43/42.11

[56] References Cited

U.S. PATENT DOCUMENTS

| | | | |
|---|---|---|---|
| 1,923,840 | 8/1933 | Ozburn | 43/42.13 |
| 2,281,578 | 5/1942 | Heddon | 43/42.13 |
| 2,479,484 | 8/1949 | Fornas | 43/42.11 |
| 3,673,726 | 7/1972 | Montagne | 43/42.11 |
| 3,747,256 | 7/1973 | Haddock | 43/42.11 |
| 4,003,154 | 1/1977 | Carver | 43/42.11 |
| 4,033,065 | 7/1977 | Shannon | 43/42.13 |
| 4,037,345 | 7/1977 | Dubois | 43/42.11 |
| 4,133,135 | 1/1979 | Miles | 43/42.13 |
| 4,201,008 | 5/1980 | Sparkman | 43/42.13 |
| 4,525,948 | 7/1985 | Huntington | 43/44.82 |
| 4,671,007 | 6/1987 | Stanczyk | 43/42.11 |
| 4,750,290 | 6/1988 | Renaud | 43/42.11 |
| 4,884,358 | 12/1989 | Grove | 43/42.13 |
| 5,058,309 | 10/1991 | Firmin | 43/42.13 |
| 5,070,640 | 12/1991 | McGahee | 43/42.11 |
| 5,138,789 | 8/1992 | Hood | 43/42.13 |
| 5,253,446 | 10/1993 | Ogle | 43/42.13 |
| 5,355,612 | 10/1994 | Smith | 43/42.13 |

*Primary Examiner*—Kurt Rowan
*Attorney, Agent, or Firm*—Joseph H. McGlynn Patent and Trademark Services, Inc.

[57] ABSTRACT

A fishing lure comprising a main wire having three support portions for holding a spinner, and two supports for securing multiple fish hooks. The hooks will hold various types of bait and because of the ganging of the hooks will resemble a school of small fish.

2 Claims, 1 Drawing Sheet

SCHOOL OF BAIT

BACKGROUND OF THE INVENTION

This invention relates, in general, to fishing lures, and, in particular, to an artificial fishing lure having plural hooks from which different types of bait may be suspended.

DESCRIPTION OF THE PRIOR ART

In the prior art various types of fishing lures have been proposed. For example, U.S. Pat. No. 2,479,484 discloses a lure having a pair of spring mounted hooks in which when a fish strikes, a release mechanism will embed the hook in the mouth of a fish. U.S. Pat. No. 3,637,726 discloses a fishing lure having a cup shaped portion on the forward end and a hook on the rearward end which will produce a jerky action in the water. U.S. Pat. No. 3,747,256 discloses a lure having a pair of arms with weights on the ends of the arms. U.S. Pat. No. 4,003,154 discloses a lure having a pair of arms, one of which holds a hook and the other holds a spinner. U.S. Pat. No. 4,037,345 discloses a lure having a hook with a guard assembly to prevent snagging of the hook. U.S. Pat. No. 4,671,007 discloses a lure with a pair of arms for holding hooks and a spinner attached to the center of the arms. U.S. Pat. No. 4,750,290 discloses a lure with a pair of hooks attached so that the hooks always face in an upward direction. U.S. Pat. No. 5,070,640 discloses a spoon type fishing lure with a hook through the spoon.

While all of the prior art lures are designed to serve a particular function, none of the prior fishing lures simulate a small school of fish. This type of small fish are the favorite food of many larger fish and such a lure would prove useful in catching this type of fish.

SUMMARY OF THE INVENTION

The present invention consists of a main wire having three support portions for holding a spinner, and two supports for securing multiple fish hooks. The hooks will hold various types of bait and because of the ganging of the hooks will resemble a school of small fish.

It is an object of the present invention to provide a new and improved fishing lure that resembles a school of small fish.

It is an object of the present invention to provide new and improved fishing lure that is inexpensive to manufacture.

These and other objects and advantages of the present invention will be fully apparent from the following description, when taken in connection with the annexed drawings.

DESCRIPTION OF THE PREFERRED EMBODIMENT

Figure 1:
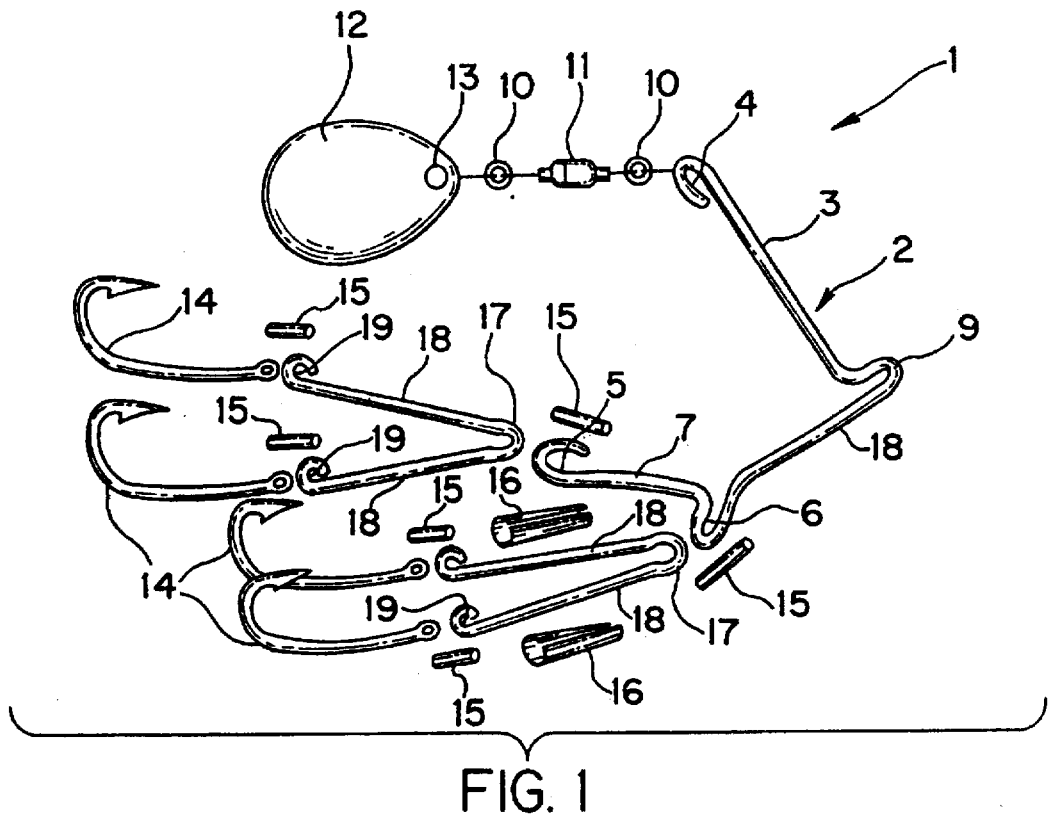
FIG. 1 is an exploded view of one embodiment of the present invention.

Referring now to the drawings in greater detail, FIG. 1 shows an exploded view of one embodiment of the present invention 1. The lure 1 has a main wire support 2 which has a central return bend 9, forming a first bend, which allows the lure to be attached to a fishing line by any conventional means (not shown). The wire support 2 can be made of any suitable material, however stainless steel is the preferred material. Extending from the bend 9 is a pair of arms 3, 8. The arm 3 has a loop 4 on the end which is used to attach a swivel ring 10, a swivel 11, and a second swivel ring 10. The second swivel ring 10 is attached to a spinner 12 by means of an aperture 13 in the spinner 12. The spinner and swivels can be attached to each other by any conventional means. The spinner can be painted in attractive colors or polished to a high sheen, in order to attract the attention of fish. The spinner 11 is used to facilitate smooth rotation of the spinner 12 through the water during retrieval or trolling of the lure.

The second arm 8, attached to the main wire support 2, has a first return bend 6, with a loop 5, which together form clip means connected thereto by an arm 7. The return bend 6 has at least a pair of fish hooks 14 attached thereto by means of a clip having a pair of arms 18 joined by a return bend 17. Loops 19, at the end of the arms 18 will be used to secure the hooks 14. The clip return bend 17 should be resilient enough to snap onto the return bend 6 and remain there, however other conventional methods could also be used to secure the clip to the bend 6. Snap on lead weights 16 can be attached to the arms 18 to help the lure maintain a proper depth in the water. Also, plastic sleeves 15 can be placed before and after the lead weights to help hold the weights in position. The plastic sleeves could be snapped onto the arms 18 similar to the lead weights, or they could be attached by any conventional means.

A second clip is attached to the loop 5 which is identical to the clip attached to return bend 6. The second clip has loops 19, at the end of arms 18, which will hold a pair of fish hooks 14. In addition plastic sleeves 15 and snap on lead weights 16 could also be used. The grouping of the multiple fish hooks 14, with bait attached will resemble a school of small bait fish, and the spinner 12 would also help attract fish to the school of bait fish.

Figure 2:
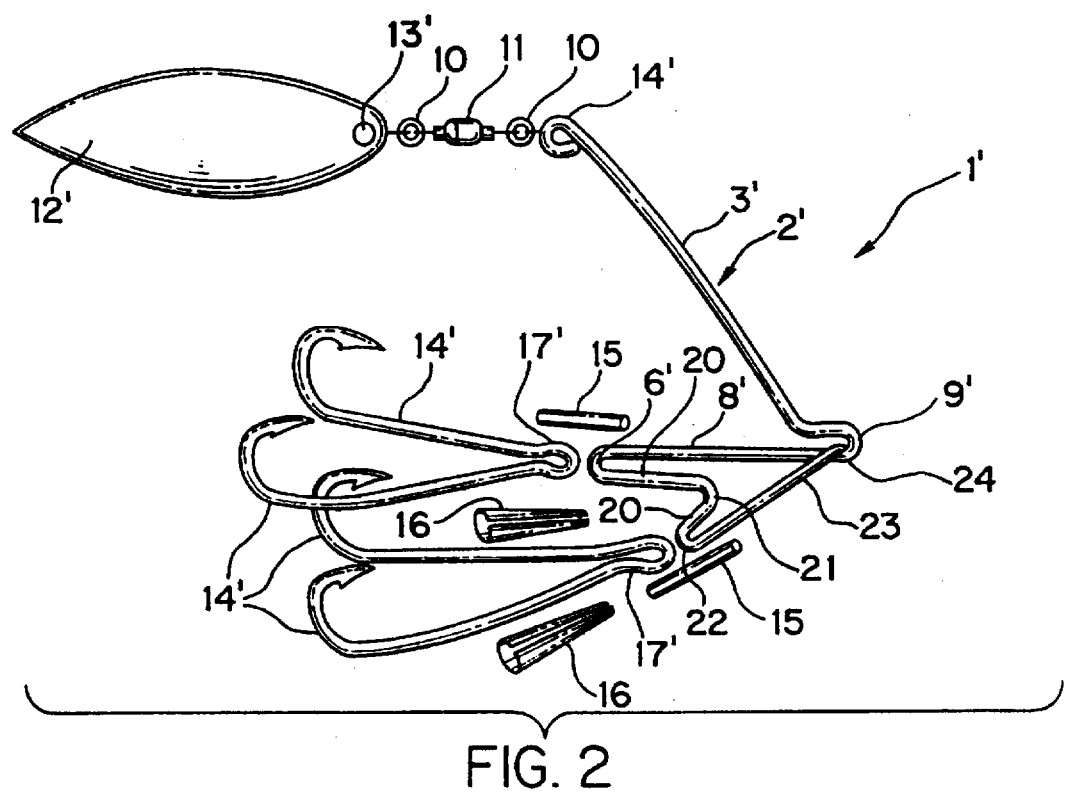
FIG. 2 is an exploded view of another embodiment of the present invention.

The second embodiment of the fishing lure shown in FIG. 2 is similar to the FIG. 1 device, and like parts are numbered the same with the addition of a prime to distinguish the two embodiments. The FIG. 2 device has a spinner 12' similar to spinner 12, but of a slightly different shape. Any type of spinner could be substituted for the spinners 12, 12' without departing from the scope of the invention. Also other fishing accessories could be substituted for the spinners.

The second embodiment 1' of the fishing lure has a main wire support with an arm 3' with a loop 14' at its end to hold a spinner 12' similar to the FIG. 1 embodiment. A return bend 9' is formed at the other end of arm 3'. Attached to the return bend is a second arm 8' with a return bend 6' which will secure at least a pair of hooks 14' similar to the FIG. 1 embodiment. Attached to return bend 6' is an arm 20, a return bend 21 and a second arm 20, another return bend 22, which is attached to arm 23, forming a W-shape. At least another pair of fish hooks 14' are attached to the return bend 22.

The arm 23 continues back toward bend 9' and stops just short of the bend, as seen in FIG. 2. The end of arm 23 can have a slight curve as shown at 24 so it can snap onto arm 8' similar to a safety pin. This will hold arm 23 and arm 8' together and can be easily unfastened in order to place or replace hooks 14' onto the lure 1'.

The fish hooks 14' used with the lure 1' are slightly different than the hooks 14 used with the FIG. 1 device. The hooks 14' have a pair of hooks 14' joined by a return bend 17'. The return bend 17' will snap onto the bends 6' and 22 and will allow the hooks to be secured thereto, but will also allow some movement between the hooks and the return bends. The hooks 14' can be snapped onto the return bends by placing the bends between the pair of hooks 14', or the arm 23 can be released from arm 8' and the hooks can be slid onto the arm 23 and then the arm 23 can be reengaged with arm 8' in order to secure the hooks. Also, snap on weights 16 and plastic sleeves 15 can be used in a similar manner as the sleeves and weights in the FIG. 1 device.

Although only two positions are shown on the main support 2 and 2' for attaching fish hooks, it should be noted that more than two positions could be provided to attach more hooks, if desired.

Although the fishing lure and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An artificial fishing lure comprising:

a main wire support, said wire support having a first bend, a pair of arms extending from said first bend, means to attract fish attached to one of said pair of arms, another of said pair of arms having at least a pair of attachment means for attaching fish hooks, said attachment means comprising return bends in said another of said pair of arms, each of said fish hooks comprising a pair of hooks joined together by a return bend, said return bend on said fish hooks interengaging with said return bends in said another of said pair of arms to attach said fish hooks to said main wire support, and wherein said another of said pair of arms and said return bends form a W-shape, and said W-shape being formed by four arms, one of the arms of said W-shape releasably engages another of the arms of said W-shape.

2. The artificial fishing lure as claimed in claim 1, wherein said means to attract fish is a spinner.

* * * * *